United States Patent
Providence

(10) Patent No.: US 12,441,165 B2
(45) Date of Patent: Oct. 14, 2025

(54) VEHICLE DASHBOARD SUNSHADE SYSTEM

(71) Applicant: McGregor Providence, Queens Village, NY (US)

(72) Inventor: McGregor Providence, Queens Village, NY (US)

( * ) Notice: Subject to any disclaimer, the term of this patent is extended or adjusted under 35 U.S.C. 154(b) by 462 days.

(21) Appl. No.: 17/993,474

(22) Filed: Nov. 23, 2022

(65) Prior Publication Data

US 2024/0166050 A1    May 23, 2024

(51) Int. Cl.
    *B60J 3/02*    (2006.01)
    *B60K 35/50*    (2024.01)
    *B60J 1/20*    (2006.01)

(52) U.S. Cl.
    CPC ............. *B60J 3/0204* (2013.01); *B60K 35/50* (2024.01); *B60J 1/2091* (2013.01); *B60K 2360/682* (2024.01)

(58) Field of Classification Search
    CPC ........ B60K 35/50; B60K 35/00; B60K 35/40; B60K 35/415; B60K 35/425; B60K 2360/682; B62D 25/14; B60J 3/0204; B60J 3/02
    USPC ...... 296/97.7, 97.8, 97.1, 97.4, 97.11, 97.12, 296/70; 160/134; 180/90
    See application file for complete search history.

(56) References Cited

U.S. PATENT DOCUMENTS

| | | | | |
|---|---|---|---|---|
| 1,411,399 | A * | 4/1922 | Beagle ...................... | B60J 3/02 296/97.4 |
| 3,021,173 | A * | 2/1962 | Levin ........................ | B60J 3/02 296/97.4 |
| 3,151,662 | A * | 10/1964 | Fait ............................ | B60J 3/02 160/32 |
| 4,861,090 | A * | 8/1989 | Gavrieli ................. | B60J 1/2088 160/370.21 |
| 4,886,104 | A * | 12/1989 | Eldridge, Jr. .......... | B60J 1/2091 296/97.7 |
| 5,243,463 | A | 9/1993 | Waintroob | |
| 5,657,810 | A * | 8/1997 | Levy ....................... | B60J 1/2091 160/370.21 |
| 5,905,546 | A | 5/1999 | Giulie | |
| 6,144,419 | A | 11/2000 | Schmidt | |
| 8,727,546 | B2 | 5/2014 | Trinh | |
| 9,596,332 | B2 | 3/2017 | Gander | |

(Continued)

FOREIGN PATENT DOCUMENTS

WO    WO2009003419    1/2009

*Primary Examiner* — Amy R Weisberg
*Assistant Examiner* — Denise Lynne Esquivel

(57) ABSTRACT

A vehicle dashboard sunshade system for reducing sun glare upon a display screen within a vehicle includes a vehicle having dashboard is positioned within the vehicle. A display screen is mounted on the dashboard and a housing is removably positioned above the display screen. The housing includes a top wall, a bottom wall, a front wall, a back wall, a first side wall, and a second side wall. A sunshade is coupled to the front wall and retractably extends from a closed position to an open position, wherein the open position guards the display screen from sunlight. A retractor is mechanically coupled to the sunshade and retracts the sunshade from an open position to a closed position when actuated. A mount is attached to the back wall of the housing and removably mounts the housing to the dashboard.

7 Claims, 5 Drawing Sheets

(56) References Cited

U.S. PATENT DOCUMENTS

| | | | |
|---|---|---|---|
| 9,776,477 B1* | 10/2017 | Erikson | G06F 1/1603 |
| 10,310,559 B2 | 6/2019 | Holmes | |
| D934,225 S | 10/2021 | Jones | |
| 2009/0266635 A1* | 10/2009 | Sato | B60K 35/00 |
| | | | 296/97.7 |
| 2013/0328343 A1* | 12/2013 | Martinez | B60J 1/2055 |
| | | | 296/97.4 |
| 2019/0152302 A1* | 5/2019 | Howard | B60J 3/0286 |
| 2023/0139859 A1* | 5/2023 | Shah | B60J 1/2091 |
| | | | 296/97.4 |

* cited by examiner

VEHICLE DASHBOARD SUNSHADE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to display screen sunshades and more particularly pertains to a new display screen sunshade for reducing sun glare upon a display screen within a vehicle.

(2) Description of Related Art Including Information Disclosed Under 37 CFR 1.97 and 1.98

The prior art relates to display screen sunshades and includes a variety of display screen sunshades being collapsible. Known prior art lacks a display screen sunshade reducing sun glare upon a display screen on a dashboard of a vehicle.

BRIEF SUMMARY OF THE INVENTION

An embodiment of the disclosure meets the needs presented above by generally comprising a vehicle. A dashboard is positioned within the vehicle and a display screen is mounted on the dashboard. A housing is removably positioned above the display screen and the housing includes a top wall, a bottom wall, a front wall, a back wall, a first side wall, and a second side wall. A sunshade is coupled to the front wall and retractably extends from a closed position to an open position, wherein the open position guards the display screen from sunlight. A retractor is mechanically coupled to the sunshade and retracts the sunshade from an open position to a closed position when actuated. A mount is attached to the back wall of the housing and removably mounts the housing to the dashboard.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
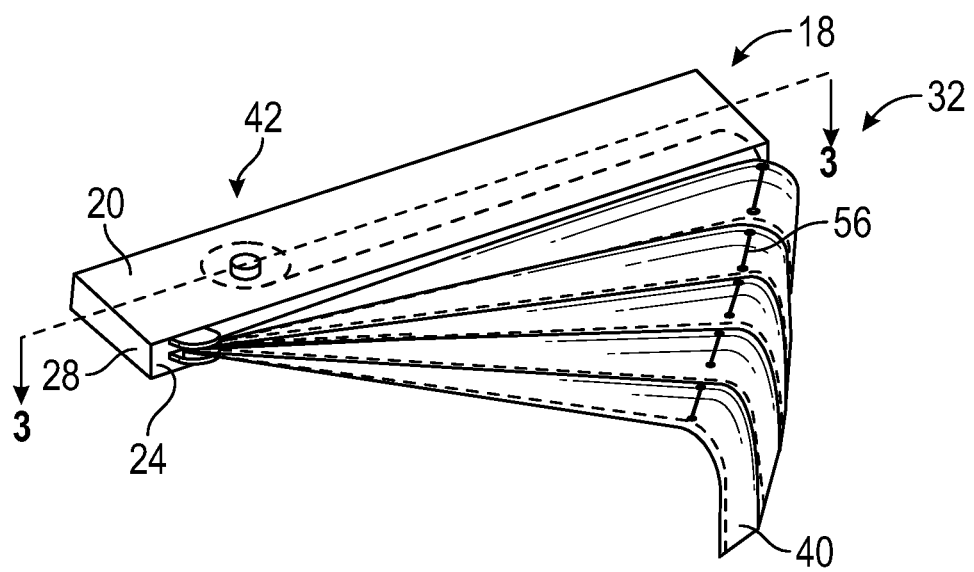
FIG. 1 is a perspective view of a vehicle dashboard sunshade system according to an embodiment of the disclosure.
Figure 2:
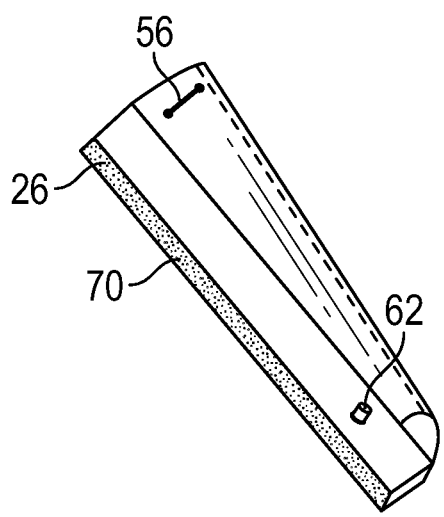
FIG. 2 is a closed rear view of an embodiment of the disclosure.
Figure 3:
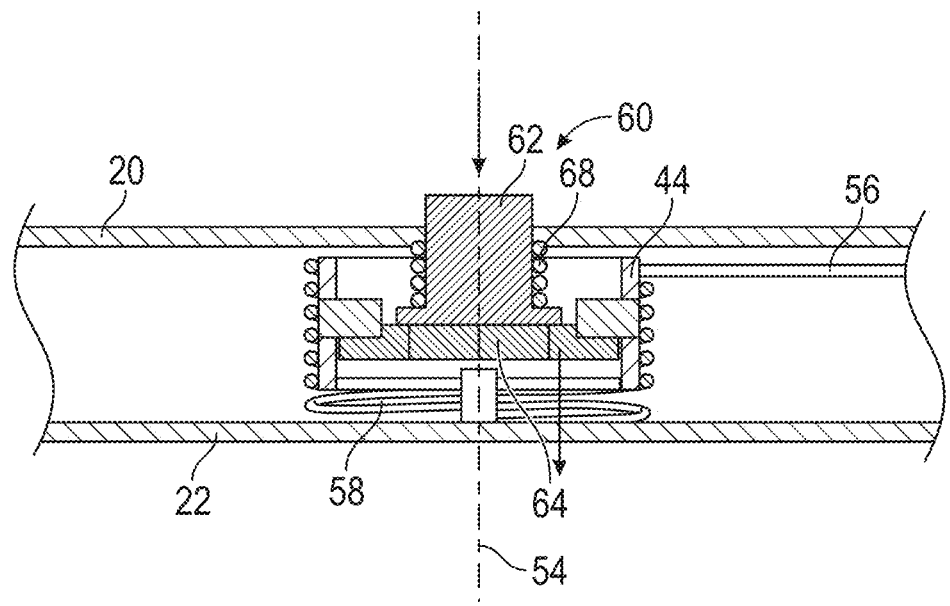
FIG. 3 is a cross-sectional view of an embodiment of the disclosure taken along Line 3-3 of FIG. 1.
Figure 4:
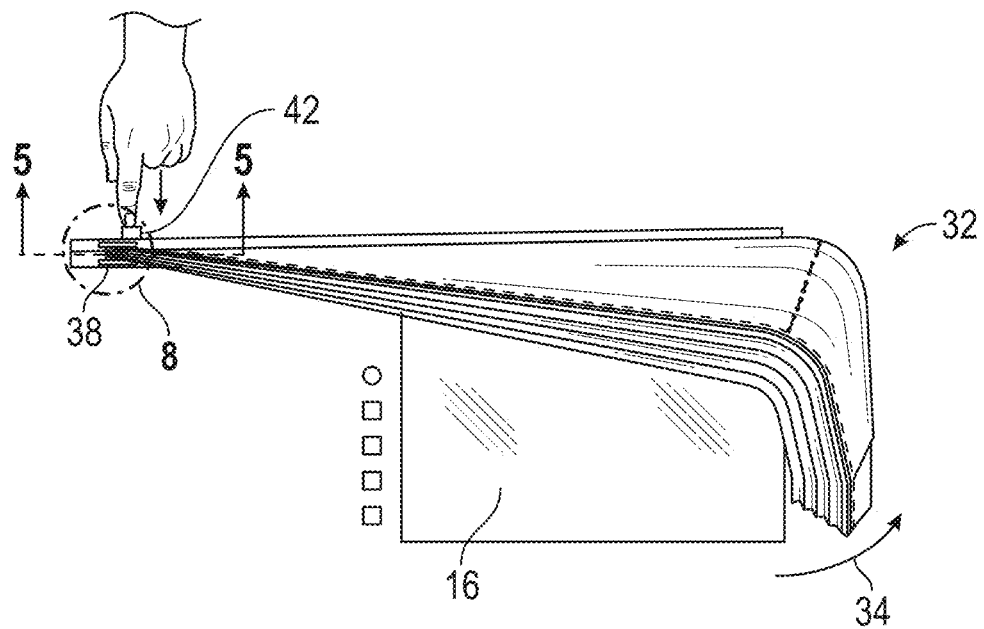
FIG. 4 is a front closing view of an embodiment of the disclosure.
Figure 5:
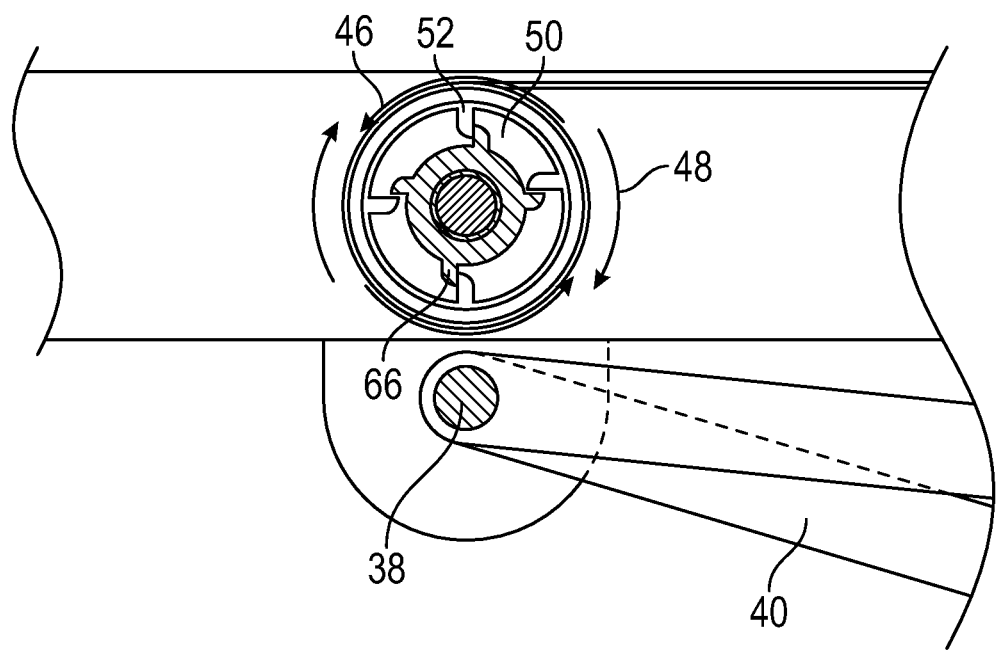
FIG. 5 is a cross-sectional view of an embodiment of the disclosure taken along Line 5-5 of FIG. 4.
Figure 6:
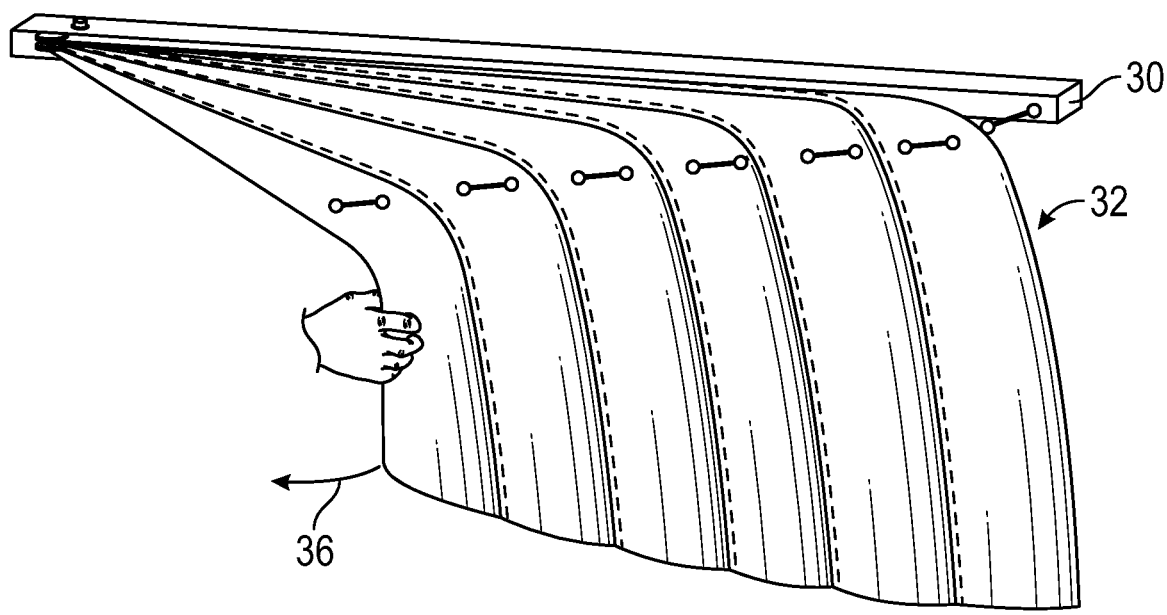
FIG. 6 is a perspective view of an embodiment of the disclosure.
Figure 7:
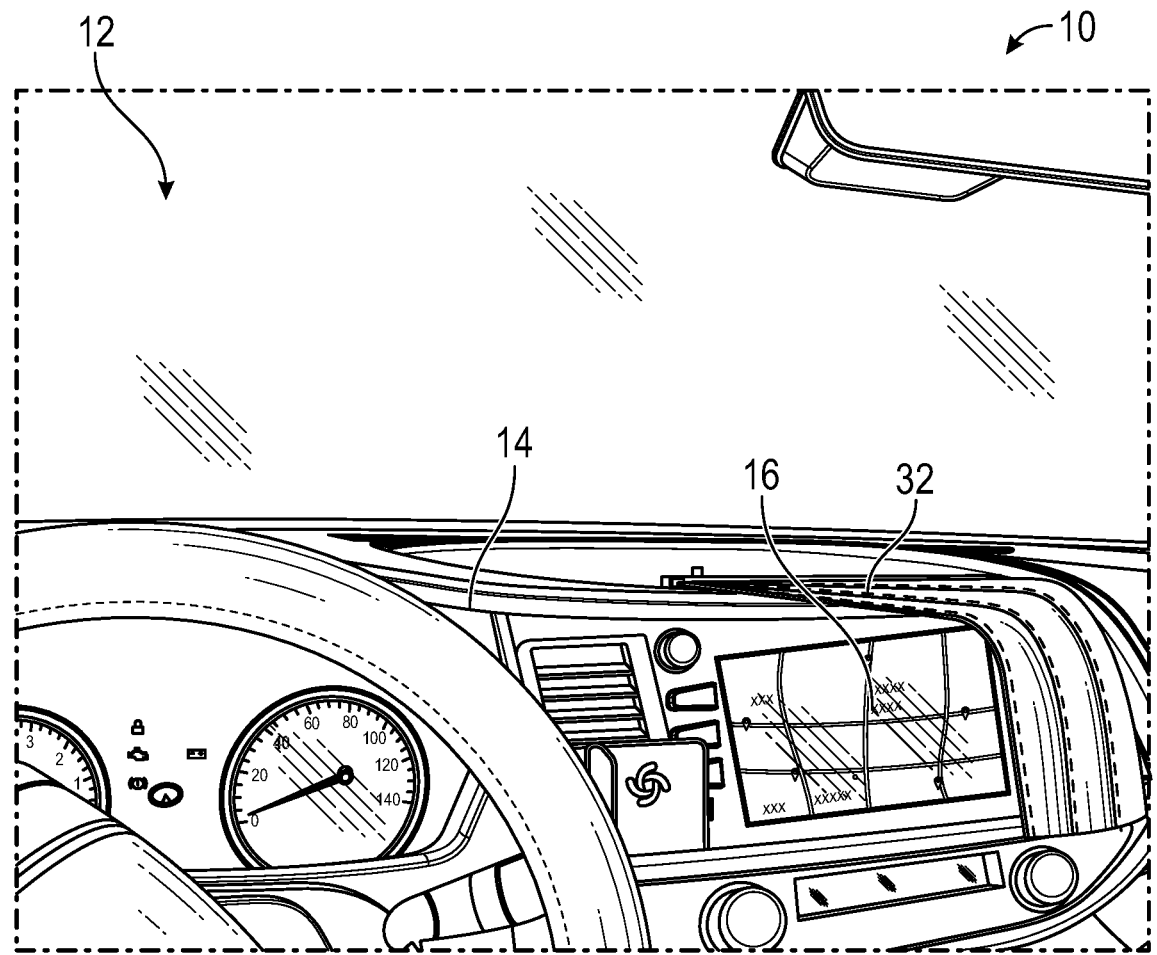
FIG. 7 is an in-use view of an embodiment of the disclosure.
Figure 8:
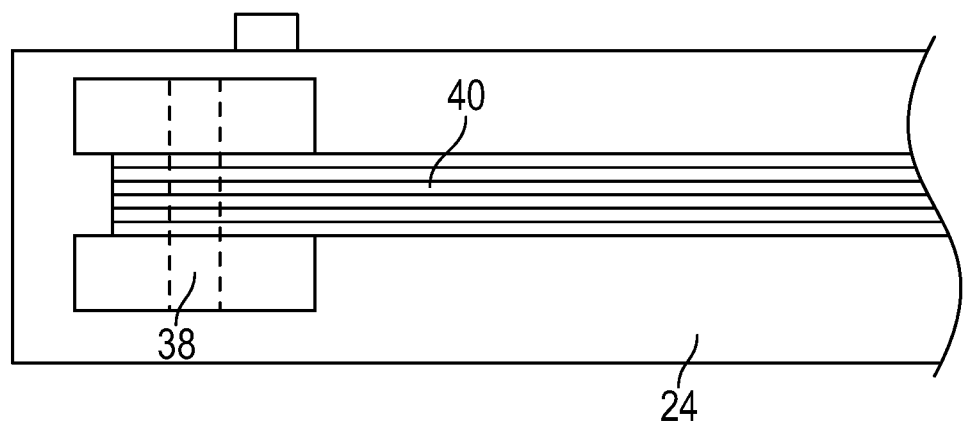
FIG. 8 is a detail view of an embodiment of the disclosure taken from circle 8 of FIG. 4.

With reference now to the drawings, and in particular to FIGS. 1 through 8 thereof, a new display screen sunshade embodying the principles and concepts of an embodiment of the disclosure and generally designated by the reference numeral 10 will be described.

As best illustrated in FIGS. 1 through 8, the vehicle dashboard sunshade system generally comprises a vehicle 12. A dashboard 14 is typically positioned within the vehicle 12 and a display screen 16 is normally mounted on the dashboard 14. A housing 18 is removably positioned above the display screen 16 and includes a top wall 20, a bottom wall 22, a front wall 24, a back wall 26, a first side wall 28, and a second side wall 30.

A sunshade 32 is coupled to the front wall 24 and retractably extends from a closed position 34 to an open position 36, wherein the open position 36 guards the display screen 16 from a sun glare. The sunshade 32 includes a pivot 38 mounted on the front wall 24 and is positioned proximate to the first side wall 28. A plurality of blades 40 is pivotally attached to the pivot 38 and the blades 40 extend from the pivot 38 and protrude downwardly proximate to the second side wall 30. The closed position 34 includes the blades 40 being positioned adjacent to the front wall 24. The open position 36 includes the blades 40 successively extending out from the front wall 24 and inwardly angled towards the front wall 24.

A retractor 42 is mechanically coupled to the sunshade 32 and retracts the sunshade 32 from the open position 36 to the closed position 34 when actuated. The retractor 42 includes a spool 44 being positioned within the housing 18 and being rotatably positionable from a first position 46 to a second position 48. The spool 44 has a center cutout 50 extending through the spool 44 and the center cutout 50 has a plurality of ridges 52 extending towards a vertical axis 54 of the spool 44. A tether 56 is wound about the spool 44 and is coupled to each blade 40 of the sunshade 32. A retraction spring 58 is mechanically coupled to the spool 44 and biasly positions the spool 44 from the second position 48 to the first position 46, wherein the retraction spring 58 draws the tether 56 towards the spool 44.

A lock 60 is mechanically coupled to the spool 44 and releasably inhibits the spool 44 from positioning from the second position 48 to the first position 46. The lock 60 includes a button 62 coupled to a disc 64. The disc 64 is positioned within the center cutout 50 of the spool 44 and has a plurality of protrusions 66 removably abutting the plurality of ridges 52 of the spool 44. The plurality of protrusions 66 allows the spool to rotate from the first position 46 to the second position 48, but inhibit rotation from the second position 48 to the first position 46. The button 62 is mounted on the top wall 20 and retractably extends the disc 64 within the center cutout 50 to disengage the lock 60 from the spool 44. The button 62 has a compression spring 68 to retract the disc 64 within said center cutout 50. The retraction spring 58 actuates the spool 44 to draw in the tether 56 to position the sunshade 32 into the closed position 34. A mount 70 is attached to the back wall 26 of the housing 18 and removably mounts the housing 18 to the dashboard 14. The mount 70 may comprise an adhesive material or another conventional mount attachable to the dashboard 14 of the vehicle 12.

In use, the housing 18 is mounted above the display screen 16 on the dashboard 14. The user pulls on the sunshade 32 to expand the blades 40 into the open position 36 to inhibit sun glare from affecting the visibility of the display screen 16. The user pushes downward on the button 62 to retract the sunshade 32 back into the closed position 34 when the sunshade 32 is no longer needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicular dashboard sunshading system comprising:
a vehicle;
a dashboard being positioned within said vehicle;
a display screen being mounted on said dashboard;
a housing being removably positioned above said display screen, said housing including a top wall, a bottom wall, a front wall, a back wall, a first side wall, and a second side wall;
a sunshade being coupled to said front wall and retractably extending from a closed position to an open position, wherein said open position guards said display screen from sunlight;
a retractor being mechanically coupled to said sunshade and retracting said sunshade from an open position to a closed position when actuated;
a mount being attached to said back wall of said housing and removably mounting said housing to said dashboard; and
wherein said sunshade includes a pivot, said pivot being mounted on said front wall and being positioned proximate to said first side wall, a plurality of blades being pivotally attached to said pivot, said blades extending from said pivot and protruding downwardly proximate to said second side wall, said closed position including said blades being positioned adjacent to said front wall, said open position including said blades successively extending out from said front wall and inwardly angling towards said front wall.

2. The vehicular dashboard sunshading system of claim 1, wherein said retractor includes a spool being positioned within said housing and being rotatably positionable from a first position to a second position, said spool having a center cutout extending through said spool, said center cutout having a plurality of ridges extending towards a vertical axis of said spool.

3. The vehicular dashboard sunshading system of claim 2, further including a tether being wound about said spool and being coupled to each blade of said sunshade.

4. The vehicular dashboard sunshading system of claim 2, further including a retraction spring being mechanically coupled to said spool and biasly positioning said spool from said second position to said first position.

5. The vehicular dashboard sunshading system of claim 2, further including a lock being mechanically coupled to said spool and releasably inhibiting said spool from positioning from said second position to said first position, said lock including a button coupling to a disc, said disc being positioned within said center cutout of said spool and having a plurality of protrusions removably abutting said plurality of ridges of said spool, said button being mounted on said top wall and retractably extending said disc within said center cutout, said button having a compression spring retracting said disc within said center cutout.

6. The vehicular dashboard sunshading system of claim 1, wherein said mount comprises an adhesive material.

7. A vehicular dashboard sunshading system comprising:
a vehicle;
a dashboard being positioned within said vehicle;
a display screen being mounted on said dashboard;
a housing being removably positioned above said display screen, said housing including a top wall, a bottom wall, a front wall, a back wall, a first side wall, and a second side wall;
a sunshade being coupled to said front wall and retractably extending from a closed position to an open position, wherein said open position guards said display screen from a sun glare, said sunshade including:

a pivot, said pivot being mounted on said front wall and being positioned proximate to said first side wall; and a plurality of blades being pivotally attached to said pivot, said blades extending from said pivot and protruding downwardly proximate to said second side wall, said closed position including said blades being positioned adjacent to said front wall, said open position including said blades successively extending out from said front wall and inwardly angling towards said front wall;

a retractor being mechanically coupled to said sunshade and retracting said sunshade from an open position to a closed position when actuated, said retractor including:

a spool being positioned within said housing and being rotatably positionable from a first position to a second position, said spool having a center cutout extending through said spool, said center cutout having a plurality of ridges extending towards a vertical axis of said spool;

a tether being wound about said spool and being coupled to each blade of said sunshade;

a retraction spring being mechanically coupled to said spool and biasly positioning said spool from said second position to said first position, said retraction spring comprising a spring coupling to said spool;

a lock being mechanically coupled to said spool and releasably inhibiting said spool from positioning from said second position to said first position, said lock including a button coupling to a disc, said disc being positioned within said center cutout of said spool and having a plurality of protrusions removably abutting said plurality of ridges of said spool, said button being mounted on said top wall and retractably extending said disc within said center cutout, said button having a compression spring retracting said disc within said center cutout; and a mount being attached to said back wall of said housing and removably mounting said housing to said dashboard, said mount comprising an adhesive material.

* * * * *